United States Patent [19]

Yoshizawa et al.

[11] 4,093,280

[45] June 6, 1978

[54] SYNTHETIC RESINOUS PIPE JOINT MADE UP IN ONE-PIECE WITH A METALLIC MALE SCREW

[75] Inventors: Tadao Yoshizawa; Saburo Kadowaki, both of Sakai, Japan

[73] Assignee: Kubota Ltd., Osaka, Japan

[21] Appl. No.: 695,564

[22] Filed: Jun. 14, 1976

[30] Foreign Application Priority Data

Jun. 14, 1975  Japan .................................. 50-80872

[51] Int. Cl.² .......................................... F16L 35/00
[52] U.S. Cl. ..................... 285/39; 285/174; 285/238; 285/328; 285/330; 285/390; 285/423; 285/DIG. 16
[58] Field of Search .............. 285/49, 39, 54, 53, 285/174, 330, 423, 328, 291, 339, 355, 390, 392, 238, DIG. 16; 85/1 R, 46, DIG. 2, 32 CS; 138/109

[56] References Cited

U.S. PATENT DOCUMENTS

| | | | |
|---|---|---|---|
| 2,069,141 | 1/1937 | Furlong | 285/238 |
| 2,696,834 | 12/1954 | Carr | 285/55 |
| 3,367,681 | 2/1968 | Braukman | 285/174 X |
| 3,519,289 | 7/1970 | Hoffer | 285/49 |
| 3,936,078 | 2/1976 | Wallyn | 285/49 |

FOREIGN PATENT DOCUMENTS

| | | | |
|---|---|---|---|
| 2,307,467 | 12/1973 | Germany | 285/174 |
| 2,225,050 | 6/1973 | Germany | 285/54 |

*Primary Examiner*—Dave W. Arola
*Attorney, Agent, or Firm*—Oblon, Fisher, Spivak, McClelland & Maier

[57] ABSTRACT

A pipe joint for connecting heterogeneous pipes is disclosed, wherein the one end, which is provided with a metallic male screw, forms a connecting portion with metallic wares, and the other end, which is molded of synthetic resin, constitutes another connecting portion with synthetic resinous goods. A nut-shaped tightener part, which is needed in time of the joint's being screw-connected with metallic pipe, is formed integrally with the metallic material which constitutes the male screw, being exposed high on the external periphery of the pipe joint, while the synthetic resinous material, which forms the synthetic resinous connecting portion, as being extended, is adhered all over the internal periphery of metallic material to be watertightened. The pipe joint is so constructed that the moment of rotation, which is acting on the nut-shaped tightener part, can be directly transmitted to the synthetic resinous material lest exfoliation of the metallic and the synthetic resinous materials should occur on coated surface of both of them when the male screw is to be screw-connected by making the nut-shaped tightener rotate, thereby leading both of them to integrated rotation.

16 Claims, 12 Drawing Figures

SYNTHETIC RESINOUS PIPE JOINT MADE UP IN ONE-PIECE WITH A METALLIC MALE SCREW

BACKGROUND OF THE INVENTION

1. Field of the Invention:

This invention relates to a pipe joint, and is more particularly concerned with a relaying pipe joint employed during the connecting of synthetic resinous products, such as synthetic resinous pipe, with metallic wares, such as metal pipe and other universal metallic parts. This invention is to be preferably applied to city water supply, agricultural irrigation piping, general interior pipe laying, indoor hot water plumbing and the like.

2. Description of the Prior Art:

Normally, the use of metallic pipe joint for connecting metallic pipes with each other and, likewise, the employment of synthetic resinous pipe joint or metallic pipe joint for fastening synthetic resinous pipes, respectively have been passed for a matter of common knowledge in the field of piping technique. The reason for this was that the pipe connecting portion is the one which is most susceptible to influences resulting from thrust due to tension and compression which are pipe-axially working, earthen pressure that is acting in the intersecting direction with the pipe axis at the time of pipe laying underground, and fluid pressure that is caused by liquid flowing through the pipe, from whence the thought that it is regarded as appropriate for a pipe-connecting part to use pipe joint which is much more strong than, or at least as strong as, the main pipe, has been prevalent heretofore. Consequently, it was an usual manner to use a metallic pipe joint, in the case where confronted with necessity, to connect a metallic pipe with a synthetic resinous one.

There was, however, a weak point in this method by which synthetic resinous pipe was to be connected with metallic pipe joint, that because of susceptibility to influences of adhesives or of the difference in the rate of thermal expansion which were produced by contact of heterogeneous materials, the reliability on water-tightness was not too high; after all, sufficient water-tightness would not be obtained, excepting some kind of mechanical joint which is liable to count on mechanical tightening force; and yet, too much intensification of this mechanical tightening force brought about a risk of breakage of synthetic resinous pipe by the tightening pressure itself.

To ward off this disadvantage, it was common to practice with relatively weak tightening, nevertheless, there happened sometimes separation accident or leakage trouble in the pipe connecting part.

A mechanical joint is composed not of an integral piece, but of various parts, such as seal packing, snap, bolt, nut and so on, with the result that annoying parts control and troublesome connecting operation are unpopular among piping workers. In spite of diverse ideas proposed, a completely satisfactory improvement has not been found yet.

On the other hand, as the field of application of synthetic resinous pipe has now been much enlarged, a variety of studies on synthetic resinous pipe joint has been greatly promoted, thus entailing a substantial amelioration of its impact strength, tensile strength, resistance to wear, etc., as the result of accumulation of designs and contrivances of its form, of wall thickness, and of condition of injection-molding. It has thus become general knowledge to use synthetic resinous pipe joint for connecting synthetic resinous pipe each between the other. Thus, it can be said that a great prospect is open to synthetic resinous pipe joint which is superior to others in economical efficiency, lightness of weight, workability and so forth. In this way, expectation for synthetic resinous pipe joint grows greater and a strong tendency to try to use it appears in part, while the following problems remain unsolved as to existing synthetic resinous pipe joint.

FIG. 1 shows a perspective view of a conventional synthetic resinous pipe joint now generally in use. From left to right, there are seen a male screw, or externally threaded portion, 1, a nut-shaped tightener 2 and a faucet 3. FIG. 2 shows a partly cutaway side view, illustrating a state of connection of a metallic pipe A with a synthetic resinous pipe C by the use of the abovedepicted pipe joint B, wherein the metallic pipe A and the pipe joint B are threadably connected, and the synthetic resinous pipe C and the pipe joint B are connected by means of adhesive. Their screw-connecting is performed by rotating, while holding the metallic pipe A stationary, the nut-shaped tightener 2 with a monkey spanner, single head, or adjustable wrench. On this occasion, the female screw or internally threaded end portion of the metallic pipe A and the male screw or externally threaded portion of the synthetic resinous pipe joint B rub heavily against each other over their corresponding thread faces because of a tapering, or narrowing toward the end, shape of the male screw of the synthetic resinous pipe joint B, thereby causing created stress to concentrate on the synthetic resinous male screw which is inferior in strength, even in the presence of a slight dimensional error. As a result, cracks occur, as does twist-off, friction loss, and so on, while on the surface 2a of the nut-shaped tightener 2, clasped by the monkey spanner or the like, abrasion or breakage occurs. Even if there are no dimensional errors, as previously mentioned, operation would be very unreliable in regard to safety, because when piping for a hot water supply or in the hottest and coldest territories, dimensional disaccordance occurs now and then, resulting from the differences between rates of thermal expansion of both materials. Even in the case that their dimensions happen to be in accord with each other, so they could be connected without excessive load, differential gaps will be induced to their thread faces from time to time owing to thermal changes after the conclusion of connection, and consequently, reliability in their water-tightness cannot help becoming remarkably low. Also, vibration and the like of pipe body, produced by pipe axial tension and compression, or bending load due to earthen pressure, and more pulsation pressure of flowing water are not negligible effects during long-term use. By dint of these effects, there occurs even a possibility to lead to the very failure of the pipe joint due to cracks created in the root of the thread.

SUMMARY OF THE INVENTION

This invention has been contrived with the previously stated considerations.

Accordingly, it is an object of the present invention to provide a kind of pipe joint wherein metallic material is combined so adroitly with a synthetic resinous one that these two materials will be able to display their own peculiar properties.

It is another object of the present invention to provide such a pipe joint that its screw part and nut-shaped tightener-part will not be impaired at the time of its being connected with a metallic pipe.

It is a further object of the present invention to provide such a pipe joint that will not invite exfoliation between the contact surfaces of both materials through moment of rotation acting at the time of screw-connecting.

It is still yet another object of the present invention to provide such a pipe joint that cannot be easily destroyed by dispersing stress against repeated load because of one united body of metallic material and synthetic resinous material.

It is an even further object of the present invention to provide such a pipe that, at the time of being connected at one end with a metallic pipe, metallic valve or pump, and at another end with synthetic resinous pipe, it may not readily cause any breakage or lowering of its water-tightness, even through variations in application purpose and piping condition or more in environmental changes occur. Other possible objects will be clearly understood from the following description.

Now, all the foregoing objects have been achieved with success in accordance with the construction of the pipe joint of this invention, which will be made clear hereinafter.

The pipe joint relating to the present invention is characterized in that the proper part of the interior of a metallic barrel provided with a nut-shaped tightener part and a male screw part, or externally threaded portion, is formed out-of-round, a synthetic resinous inner layer having an inner form of almost roundness is formed all over the internal face of the metallic barrel, and the synthetic resinous material forming this inner layer constitutes a synthetic resinous pipe connecting portion extending integrally in the opposite direction to the male screw part.

The pipe joint designated here is the one wherein the male screw part, constituting a screwed-in spigot, and the nut-shaped tightener part are both made up of metallic material, and their inside faces are coated with lightweight synthetic resinous material, while the opposite-side connecting part, whether a faucet or a spigot, is molded of synthetic resinous material. Therefore, on the connecting side with metal wares, such as metallic pipe or metallic parts, is applied the male screw part, whereby the male and female metallic screws, or threaded portions, are connected with each other, while on the connecting side with synthetic resinous goods, such as synthetic resinous pipe or parts, is employed the synthetic resinous connecting part, whereby synthetic resinous materials are connected with each other. Namely, since homogeneous materials are always adaptable at the connecting part, satisfactory connection is able to be performed, well-balanced in size, accuracy and strength, and without the above-mentioned troubles. In addition, the moment of rotation, at the time of rotating the male screw part, being clasped by a monkey spanner, is sure to be transmitted almost to the synthetic resinous material of the inner layer, because the inside face of the metallic barrel is formed out-of-round, whereupon the synthetic resinous layer being formed is adhered closely. Consequently, it can be said that shear exfoliation force does not work between these two, and they come to be able to rotate in monobloc as concerns their reciprocal rotation, and they can be said to be maintained relatively non-rotatable. As a result, there occurs no exfoliation of their boundary surfaces, and also there is little fear of flowing liquid leaking from gaps between the materials.

What is more, since the inside face of the metallic member is coated all over and all around with the synthetic resinous material, the pressure of fluid flowing through the pipe acts on the synthetic resinous layer, as if expanding it, thus greatly elevating its integrality with the metallic material. Accordingly, the danger of leaking from the gaps between the metallic and synthetic resinous material comes to be completely eliminated. Such effects are displayed more remarkably when fluid flowing through the pipe is at a high temperature. The reason for this is that the rate of thermal expansion of the synthetic resinous material is larger by nature than that of the metallic material, so that the contact pressure between the synthetic resinous material on the inside and the metallic material on the outside becomes by far larger all the more.

The essential part of the pipe joint relating to the present invention has such a construction as mentioned above.

An expressly suitable construction to be provided for this kind of pipe joint is so designed that the interior of the metallic material may be deeply excavated for the purpose of reducing the consumed amount of metallic material, of lightening the weight of the body as the whole, and of enhancing the ability to transmit the moment of rotation, and that the excavated interior may be formed out-of-round, or if possible to do so, polygonal.

A further suitable construction is so designed that the metallic material which constitutes the nut-shaped tightener part is extended in the opposed direction of the male screw part, being embedded in the synthetic resinous material which composes the synthetic resinous connecting portion. In this manner, the reinforcement effect of the synthetic resinous connecting portion will be obtained, and the boundary length between both materials becomes longer, thereby resulting in a far less possibility for flowing liquid to leak from the gap between the boundary surface of both materials. Also, in this case, this very gap becomes substantially a negligible quantity, owing to the tightening pressure produced by the synthetic resinous material because of the sandwich-construction of the metallic and synthetic resinous materials, being accompanied by an effect that the danger of leakage should be practically eliminated since the penetrating pressure of leak has a tendency to make the microscopic gaps on the opposite, e.g., the outer, side more and more smaller, even if leakage comes into the one, e.g., the inner, side of the microscopic gaps between them.

A still further suitable construction of the pipe joint is so contrived that the inside face of its male screw part and both the inner and outer faces of the extended part of synthetic resinous material may be furnished with an irregular, or convex-concave, part, so that the length of the boundary surface becomes longer, while the danger of exfoliation between both materials can be completely obviated, with better water-tightness acquired.

Other suitable constructions include providing the irregular part with inclined angles having intersecting directions with the pipe axis and fitting a seal packing on the boundary surface of both materials so that its close adhesion or water-tightness becomes much greater than ever.

Referring to the synthetic resinous connecting portion, it can be made up at will in various forms such as a faucet, spigot or a flanged connection part. Another especially suitable construction is one wherein the synthetic resinous material may protrude rib-shapedly toward its own peripheral part.

Incidentally, the synthetic resinous resin material here in question is not always to be limited to such as thermoplastic resin or thermosetting resin, among which, however, hard polyvinyl chloride resin has been deemed preferential with excellent results so far.

In compliance with the present invention, the metallic member and the synthetic resinous layer are closely adhered by injection-molding molten resin into the metallic member, which is stationed in advance, as a rule, within a metal mold. Here is also an advantage that substantially perfect adhesion can be acquired, thanks to resin heat generated at the time of injection-molding, provided that the surface of the metallic member has been coated beforehand with thermosetting adhesive, and with acquisition of the effect of maintaining the positive water-tightness even under the appreciably severe conditions.

Other effectual pipe joints will be clearly understood by themselves from the circumstantial explanation mentioned below.

DETAILED DESCRIPTION OF PREFERRED EMBODIMENTS

Figure 3:
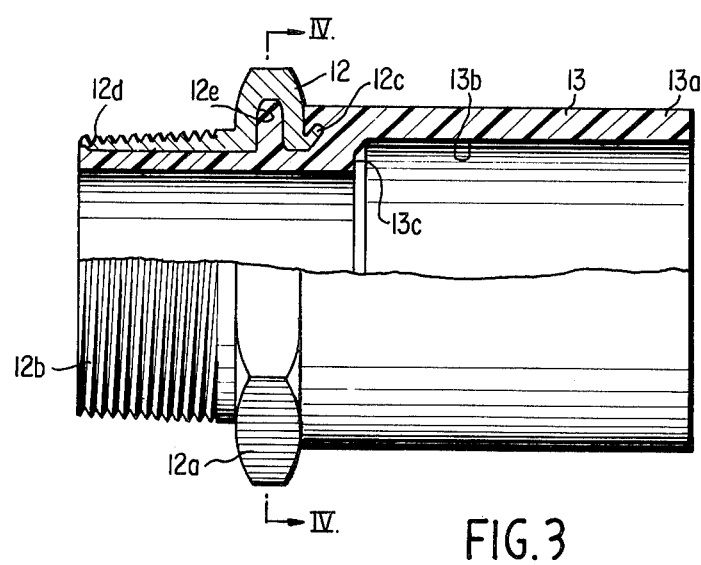
FIG. 3 is a cutaway side view, partly in section, of the upper part of a pipe joint constructed according to this invention.

Referring now to the drawings, FIG. 3 shows a representative example of the pipe joint relating to the present invention.

Figure 1:
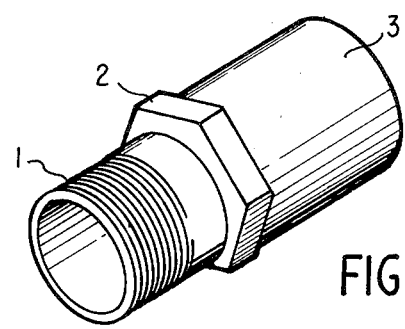
FIG. 1 is a perspective view illustrating an example of a conventional synthetic resinous pipe joint.
Figure 2:
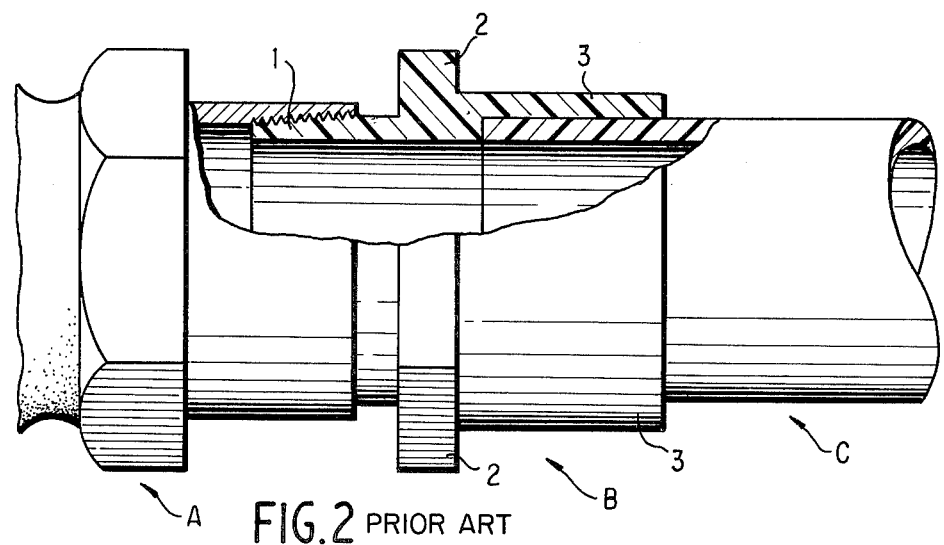
FIG. 2 is a partly cutaway side view of the pipe joint shown in FIG. 1 used in a state when it is, on one side, screw-connected with a valve and, on the other, adhesive-connected with a synthetic resinous pipe.

This pipe joint is provided in one-piece with a metallic member 12 and a synthetic resinous member 13, where a layer of the latter, the essential component of which is made of, for example, hard polyvinyl chloride resin, covers all over and all around the internal periphery of the metallic member 12, having a nut-shaped tightener part 12a and a male screw part 12b in ond body. On the left side of the figure, the metallic connecting portion is formed and, on the right side of the figure, the synthetic resinous connecting portion, a faucet part 13a, is formed by extending the synthetic resinous member 13. In the metallic member 12, besides the nut-shaped tightener part 12a and the male screw part or externally threaded portion 12b, a tongue part 12c is embedded, as being protruded in the opposite direction to the male screw part 12b, within the synthetic resinous member 13. In the nut-shaped tightener part 12a, the interior of which is excavated, a cavity part 12e is formed, and in the inside of the tip of the male screw part 12b is formed a hitching part 12d which consists of a slant inclined in the intersecting direction at a slant with the pipe axis. In the synthetic resinous member 13 is formed a tapered face 13b, which widens toward the aperture part, for the purpose of complete adhesive-connecting with a spigot pipe (equivalent to "C" in the FIG. 2), and also a stopper or shoulder 13c is formed in order to control a stock for inserting the spigot pipe.

Figure 4:
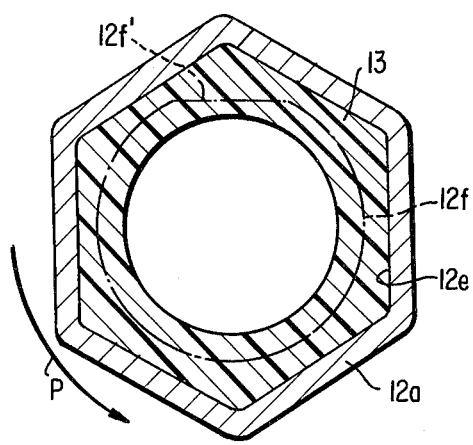
FIG. 4 is a cross-sectional view taken along line IV—IV of FIG. 3.

As seen in FIG. 4, a cross-sectional view taken on line IV—IV of FIG. 3, the inside of the cavity 12e is of a hexagon shape similar to the nut-shaped tightener part 12a, and its inner layer is formed by the synthetic resinous member 13 which fills it up, as if eating thereinto, so as to closely adhere face to face to the hexagon. Consequently, since the moment of rotation produced at the time of rotating the nut-shaped tightener part 12a in the direction of arrow P is directly transmitted to the synthetic resinous member 13 and the inner layer, the shear exfoliation force is not created in the boundary surface between them, and their close adhesion in the boundary surface remains constant and stable. Incidentally, the shape of the cavity part 12e is not necessarily confined only to being hexagonal, but any optional shape may be substituted. If a face which is indicated by a virtual line 12f were adopted as an inner face of the nut-shaped tightener part 12a, without purposely excavating, another high effectiveness in transmitting the moment of rotation may be likewise obtained. In this case, as this virtual line 12f is not of roundness, its flat part 12f comes to give full play to its own ability of transmitting the moment of rotation. Otherwise, as an out-of-round inner face, an elliptical shape and such may be acceptable. When the cavity part 12e, however, is formed by excavating, it will not only bring about economy of the metallic member 12, but also will exhibit an effect of lightening the whole weight. The tongue edge part 12c and the hitching part 12d have severally a function of preventing the synthetic resinous member 13 from being deformed or shifting in the orthogonal and parallel directions to the pipe axis. Also, the synthetic resinous member 13, which fills up both the cavity part 12e and the outside end 12h, has likewise a function to check itself from being deformed or shifting in the parallel direction to the pipe axis, thanks to its holding the metallic member 12 in sandwich-shape, and further another function is to fend off these two members' break away in the direction parallel to the pipe axis.

Figure 5:
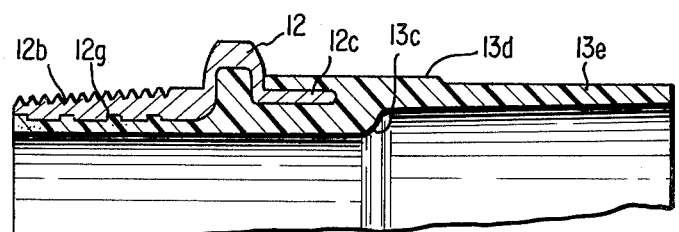
FIGS. 5 and 6 are longitudinal sectional views of an essential part of the invention.

FIG. 5 is another example which is almost the same as FIG. 3, with the exception of the following points:

1. the tongue edge part 12c is elongated relatively further, 2. the inside face of the metal screw part 12b is provided with a ringshaped irregularity (convex-concave), such as part 12g, 3. the synthetic resinous member on the faucet part 13a side is provided with the thick part 13d and the thin part 13e, and 4. the stopper 13c on the faucet part 13a side is made rounder.

Elongation of the tongue edge part 12c has an aim to reinforce the synthetic resinous faucet side, while enlargement of the boundary surface length between the metallic member 12 and the synthetic resinous member 13 has an end to enhance the water-tightness. The reinforcement function on the faucet side, which is demonstrated in cooperation with the thick part 13d, has an effect of maintaining the balance with the strength of the metallic male screw part 12b. The thin part 13e is designed considering the danger of unnecessary use of a large amount of synthetic resin. The provision of the ring-shaped irregular (convex-concave) part 12g tends to elevate the function of water-tightness by elongating the boundary surface length. The rotundity of the stopper or shoulder 13c is made up so as to prevent cracks of the synthetic resinous member 13 produced by adherence pressure in the case of inserting by force a spigot pipe, thus carrying out a function of dispersing the adherence pressure.

Figure 6:
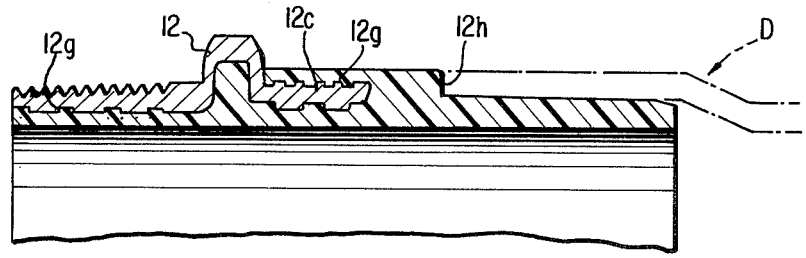

FIG. 6 shows a further embodiment, which is essentially the same as the foregoing embodiments, with the exception of the following points: (1) both the inner and outer faces of the tongue edge part 12c are provided with the same ring-shaped irregularity (convex-concave), as part 12g, as that of the inside of the male screw part 12b, and (2) the synthetic resinous connecting portion is formed in the shape of a spigot. The ring-shaped irregular (convex-concave) part 12g here executes the substantially same function as that depicted in FIG. 5. That which is indicated by a virtual line is a synthetic resinous faucet pipe D, while the step 13f, which fulfills the function of a stopper, closely touches the end of the faucet pipe D.

Figure 7:
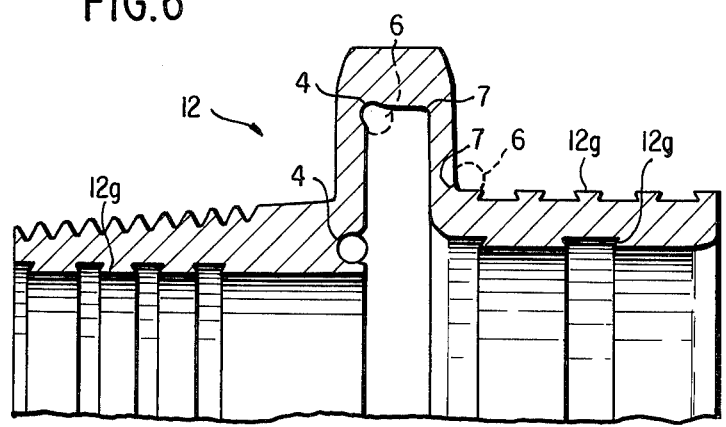
FIG. 7 is an enlarged sectional view of an essential part of the metallic member.

FIG. 7 is an enlarged longitudinal sectional view of an essential part of the metallic member 12 employed in the present invention. The ring-shaped irregularly shaped (convex-concave) part 12g indicated here is provided with inclined faces in the intersecting direction slantwise with the pipe axis. Consequently, if the metallic member 12, as such, is used, the integrality of both members becomes more preferable and the water-tightness is also elevated, because the synthetic resinous material fills up, being inserted as if embraced, this irregularly shaped (convex-concave) part 12g. This irregular part 12g may be composed either of an irregularity having separately isolated stripes or one which is screw-threadedly shaped.

Figure 9:
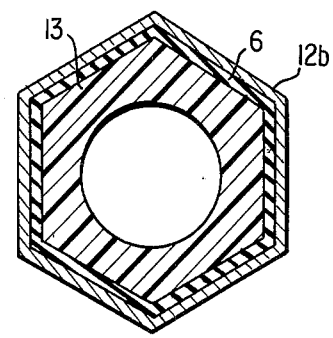
FIG. 9 is a cross-sectional view taken along line IX—IX of FIG. 8.

Although the tongue edge 12c is described to be barrel-shaped, it is of course true that thrusting out, separately isolated rod-shaped pieces of several stripes may be also adoptable. "6", designated by a dotted line in FIG. 7, is a seal packing provided on the illustrated position, which works to enhance the function of maintaining the water-tightness in the condition of injection-coating the synthetic resin thereover. On this occasion, there is a possiblity that the packing 6 will be separated from its loaded position, however, it is protected by either providing the groove 4 for loading it, as shown in the figure, of by being loaded in the corner 7. There is no doubt that it does not matter to interpose a plurality of packings 6, but even one of them would be able to fully achieve the expected goal. The shape of the packing 6 is not practically limited at all, but at the time when loaded within the cavity 12e, as shown in FIG. 9, its shape is required to be corresponding to the inner form (hexagonal in FIG. 9) of the cavity 12e. Otherwise, it is desirable for it to be of roundness. In this occasion, there occurs a case of employing adhesive sometimes for the purpose of complete adhesion of metallic material with the synthetic resinous one, and also of stable fixation of the packing 6. Among adhesives for such use, the one which makes the most of the injected resin heat, that is, the adhesive, the main component of which is thermosetting resin, has been thought as the most suitable so far, but any kind and sort of resin materials should not restrict the concept of this invention at all.

Figure 8:
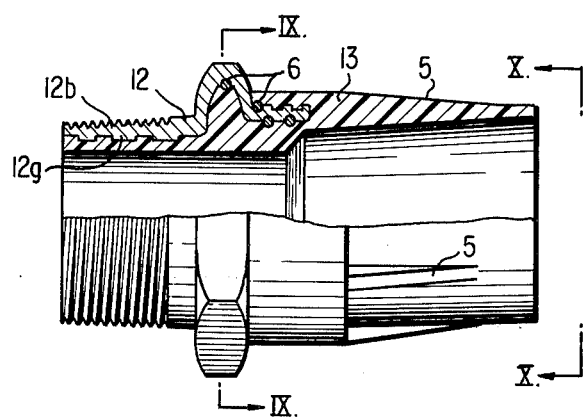
FIGS. 8 and 11 are cutaway sectional side views of the upper halves illustrating other embodiments of the invention.
Figure 10:
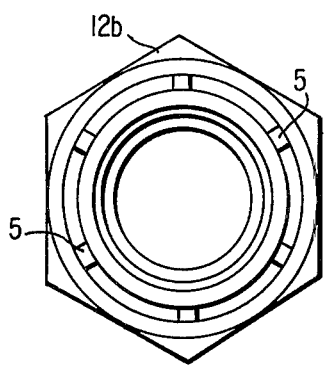
FIGS. 10 and 12 are cross-sectional views taken along line X—X of FIG. 8 and line XII—XII of FIG. 11, respectively.
Figure 11:
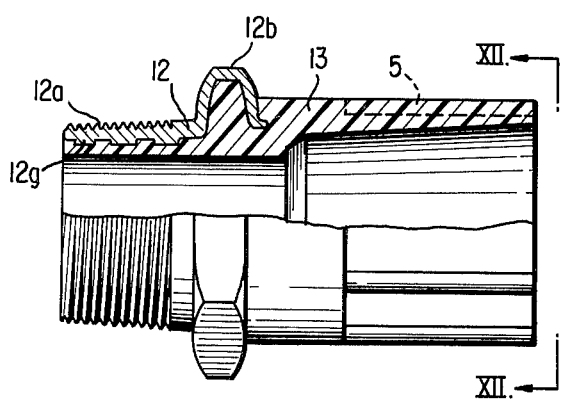
Figure 12:
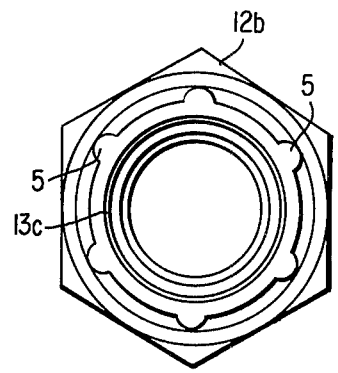

FIGS. 8 and 10 are still other examples of this invention, which are characterized by the provision of the rib 5 on the synthetic resinous connecting portion side. This is in order to maintain a balance between the strength of the synthetic resinous connecting portion and that of the metallic connecting portion. The shapes and sizes of the rib 5 are not at all limited. As seen from FIGS. 11 and 12, for example, the rib 5 may be of such construction, wherein it is able to be extended up to the end of the synthetic resinous connecting portion. Since the rib 5 provided in such manner works as a certain kind of radiating fin, it has an effect to lessen internal residual stress by uniform cooling at as much a rate as synthetic resin filled in the side of metallic member during the cooling process after injection-molding of the synthetic resinous material.

Though all the examples described above relate to only straight pipe joints, it goes without saying that other sorts of pipe joints such as bend pipe joint for bend piping fall within the scope of the present invention.

What is claimed as new and desired to be secured by letters patent of the United States is:

1. A pipe joint for connecting heterogeneous pipes comprising:
   a metallic pipe connecting portion forming one end of said pipe joint and being externally threaded at one end thereof;
   a synthetic resinous pipe connecting portion forming the other end of said pipe joint;
   said metallic pipe connecting portion having a nut-shaped part formed on its outer peripheral surface between the externally threaded one end thereof and the other end thereof to facilitate tightening of said pipe joint, the inside face of metallic material constituting said nut-shaped tightener part exhibiting an out-of-round excavated form;
   the other end of said metallic pipe connecting portion extending from said nut-shaped tightener part in the opposite direction of said externally threaded one end thereof being substantially tubular in configuration, and the external and internal peripheral surfaces of said substantially tubular configured other end of said metallic pipe connecting portion being provided with a ring-shaped part irregularly configured along the length thereof so as to provide, alternatingly, increasing and decreasing radial dimension thereof along any given line drawn longitudinally along the peripheral surface of said tubular other end;
   said resinous pipe connecting portion including an integral inner layer completely covering the entire inner surface of said metallic pipe connecting portion extending from said resinous pipe connecting portion in the direction of said metallic pipe connecting portion, and including the inner surfaces of said externally threaded end, the excavated part of said nut-shaped part and the tubular other end of said metallic pipe connecting portion;
   said resinous pipe connecting portion further embedding said tubular other end of said metallic pipe connecting portion, including the irregularly configured external peripheral surface thereof; and said inner layer of said resinous pipe connecting portion having an inner surface form of substantial roundness throughout the length thereof and of the inner surface of said metallic pipe connecting portion which it covers.

2. A pipe joint as claimed in claim 1, wherein the inner form of said excavated part of said nut-shaped tightener part is formed polygonal.

3. A pipe joint as claimed in claim 1, wherein the internal peripheral face of the metallic material constituting said externally threaded one end of said pipe connecting portion is irregularly configured so as to provide, alternatingly, increasing and decreasing inner radial dimensions for said pipe connecting portion along the length thereof, taken from the axis thereof.

4. A pipe joint as claimed in claim 3, wherein said irregularly configured internal peripheral face of said externally threaded one end of said pipe connecting portion includes a plurality of slants inclined relative to the pipe axis.

5. A pipe joint as claimed in claim 1, wherein a thermosetting adhesive is interposed in the boundary surface between said metallic metal and said synthetic resinous material, respectively, of said metallic pipe connecting portion and said synthetic resinous pipe connecting portion.

6. A pipe joint as claimed in claim 1, wherein a seal packing is interposed in the inside of said excavated part of said nut-shaped tightener part of said metallic pipe connecting portion.

7. A pipe joint as claimed i claim 1, wherein a groove for loading packing is provided on the wall face of said metallic material corresponding to a packing-imposed part.

8. A pipe joint as claimed in claim 1, wherein at least one seal packing is interposed in at least one respective groove formed within said irregularly configured part of said substantially tubular configured other end of said metallic pipe connecting portion.

9. A pipe joint as claimed in claim 1, wherein said synthetic resinous pipe connecting portion is formed as a pipe spigot.

10. A pipe joint as claimed in claim 1, wherein said synthetic resinous pipe connecting portion is formed as a pipe faucet.

11. A pipe joint as claimed in claim 10, wherein the external periphery of said synthetic resinous pipe connecting portion includes rib protrusions.

12. A pipe joint as claimed in claim 1, wherein said synthetic resinous material is of hard polyvinyl chloride.

13. A pipe joint as claimed in claim 1, wherein the formation of said synthetic resinous layer is performed by injecting molten resin on a metallic member which is stationed beforehand within a metal mold, thereby leading to close adhesion of the boundary surface between both materials.

14. A pipe joint as claimed in claim 1, wherein said irregular configuration of said ring-shaped part of said substantially tubular configured other end of said metallic pipe connecting portion includes a series of concave and convex portions.

15. A pipe joint as claimed in claim 3, wherein said irregular configuration of said ring-shaped internal face of said externally threaded one end of said pipe connecting portion is constituted by a series of concave and convex, respectively, portions.

16. A pipe joint as claim in claim 1, wherein said irregularly configured ring-shaped part includes a plurality of slants inclined relative to the pipe axis.

* * * * *